US008929251B2

(12) United States Patent  (10) Patent No.: US 8,929,251 B2
Engebretsen et al.  (45) Date of Patent: *Jan. 6, 2015

(54) SELECTING A MASTER PROCESSOR FROM AN AMBIGUOUS PEER GROUP (71) Applicant: International Business Machines Corporation, Armonk, NY (US)

(72) Inventors: David R. Engebretsen, Cannon Falls, MN (US); Stephen A. Knight, Rochester, MN (US); Adam C. Lange-Pearson, Rochester, MN (US); Jaimeson J. Saley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/736,413

(22) Filed: Jan. 8, 2013

(65) Prior Publication Data

US 2013/0155837 A1 Jun. 20, 2013

Related U.S. Application Data (63) Continuation of application No. 13/327,307, filed on Dec. 15, 2011.

(51) Int. Cl.
*H04L 12/28* (2006.01)
*G06F 15/16* (2006.01)
*H04L 12/24* (2006.01)
*H04L 12/933* (2013.01)
*H04L 29/08* (2006.01)

(52) U.S. Cl.
CPC ............ *H04L 41/0803* (2013.01); *H04L 41/12* (2013.01); *H04L 49/15* (2013.01); *H04L 67/1051* (2013.01); *H04L 29/08351* (2013.01)
USPC .......................................... 370/254; 709/209

(58) Field of Classification Search
USPC .......... 709/208–209, 223, 211–216; 370/254, 370/255, 258, 389, 392, 216, 218; 710/105, 710/305, 22, 110; 700/2, 3, 5
See application file for complete search history.

(56) References Cited

U.S. PATENT DOCUMENTS 6,941,350 B1 9/2005 Frazier et al.
6,981,025 B1 12/2005 Frazier et al.
7,120,683 B2 10/2006 Huang
7,133,955 B2 11/2006 Mayhew et al.
(Continued)

OTHER PUBLICATIONS

Engebretsen et al.: "Selecting a Master Processor From an Ambiguous Peer Group"; U.S. Appl. No. 13/327,307, filed Dec. 15, 2011.

*Primary Examiner* — Habte Mered
(74) *Attorney, Agent, or Firm* — Patterson & Sheridan LLP (57) ABSTRACT A distributed switch may include a plurality of special-purpose processors that control the different functions of the switch. To enable some special services, however, the distributed switch may need one of these processors to perform the role of a master. When a processor is powered on, the processor may publish a corresponding unique ID. Before electing the master, the special-purpose processors may use a discovery process to identify the network topology of the switch and evaluate the published IDs to determine which processor should be the master. If all the processors nominate the same master processor, then that processor is elected as the master and may finish configuring the distributed switch to enable the special services.

14 Claims, 7 Drawing Sheets

(56) References Cited

U.S. PATENT DOCUMENTS

| | | |
|---|---|---|
| 7,461,130 B1 | 12/2008 | AbdelAziz et al. |
| 7,505,403 B2 | 3/2009 | Santoso et al. |
| 7,630,299 B2 | 12/2009 | Magret et al. |
| 7,675,869 B1 * | 3/2010 | Anker et al. .................. 370/255 |
| 2003/0177273 A1 * | 9/2003 | Nakamura et al. ............ 709/251 |
| 2008/0281938 A1 | 11/2008 | Rai et al. |
| 2008/0294276 A1 * | 11/2008 | Nakayama ..................... 700/94 |

* cited by examiner

SELECTING A MASTER PROCESSOR FROM AN AMBIGUOUS PEER GROUP

CROSS-REFERENCED TO RELATED APPLICATIONS

This application is a continuation of co-pending U.S. patent application Ser. No. 13/327,307, filed Dec. 15, 2011. The aforementioned related patent application is herein incorporated by reference in its entirety.

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

Instead of one physical switch, the switch may comprise a plurality of distributed switch elements. For these switching elements to work together, they typically perform a network discovery process to locate the different hardware components that make up the switch. During this discovery process, the distributed switches may organize themselves into a hierarchy (e.g., leader/member) such that one of the switch elements is selected to supervise a particular function or service performed by the switch.

SUMMARY

Embodiments of the invention provide a method, computer program product and a system for electing a master processor from a plurality of processors.

In one embodiment, the method and computer program product comprise storing in a first portion of a shared memory a first unique identifier for a first processor of the plurality of processors, where the shared memory is accessible by the plurality of processers via a network fabric. The method and computer program product further comprise traversing the network fabric comprising the plurality of processors and reading, from a second portion of the shared memory, a second unique identifier associated with a second processor of the plurality of processors. The method and computer program product comprise determining, based on one or more criteria, a nominee identifier from among the first and second unique identifiers and storing the nominee identifier in a register in the first portion of the shared memory, where the nominee identifier is read from the register by one of the plurality of processors. The method and computer program product further comprise electing the master processor that corresponds to the nominee identifier.

In one embodiment, the system comprises a first processor of the plurality of processors, a second processor of the plurality of processors, and a shared memory that is accessible by the plurality of processers via a network fabric. The shared memory comprising a first portion storing a first unique identifier for the first processor and a second portion storing a second unique identifier for the second processor. The first processor is configured to read from the second portion the second unique identifier and determine, based on one or more criteria, a nominee identifier from among the first and second unique identifiers. The first processor is configured to store the nominee identifier in a register in the first portion of the shared memory, wherein the nominee identifier is read from the register by one of the plurality of processors. At least one of the plurality of processors elect the master processor that corresponds to the nominee identifier.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

A distributed, virtual switch may appear as a single switch element to a computing system (e.g., a server) connected to the distributed switch. In reality, the distributed switch may include a plurality of different switch modules that are interconnecting via a switching layer such that each of the switch modules may communicate with any other of the switch modules. For example, a computing system may be physically connected to a port of one switch module but, using the switching layer, is capable of communicating with a different switch module that has a port connected to a WAN (e.g., the Internet). To the computing system, the two separate switch modules appear to be one single switch. Moreover, each of the switch modules may be configured to accept and route data based on two different communication protocols.

The distributed switch may include a plurality of special-purpose processors that control the different functions of the switch modules. In order to transfer data packets or frames between the switch modules, the different switch modules may be given unique addresses. To ensure that the addresses are unique, the distributed switch may elect one of the special-purpose processors to assign these addresses. That is, one of the processors located on one of the switch modules may assign addresses to all of the switches (i.e., a sub-switch) on the switch modules.

Even though the distributed switch may not be able to transmit data frames between the switch modules before the bridging elements are assigned addresses, the processors on each switch module may still use a discovery process to identify the network topology of the switch—i.e., locate the processors and bridging elements on different switch modules.

When a switch module is powered on, the processor may publish a corresponding unique ID. During network topology discovery, the processors may evaluate the published IDs to determine which processor should be the master. If all the processors nominate the same master processor, then that processor is elected as the master and may finish configuring the distributed switch—e.g., assigns unique addresses to the switches in the switch modules.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

Figure 1:
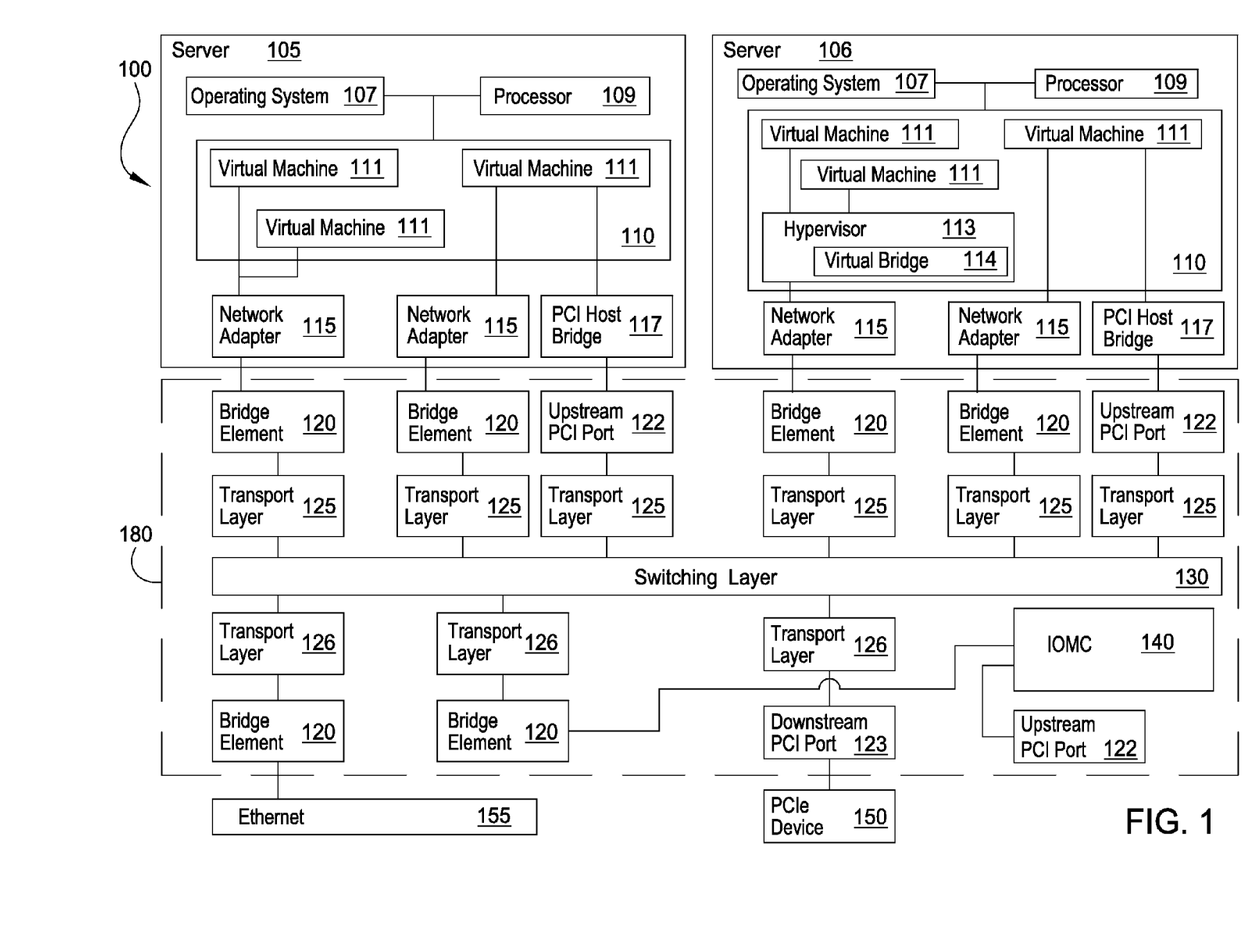
FIG. 1 illustrates a system architecture that includes a virtual switch, according to one embodiment of the invention.

FIG. 1 illustrates a system architecture that includes a virtual switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may be considered to include memory storage physically located in the server 105 or on another computing device coupled to the server 105.

The server 105 may operate under the control of an operating system 107 and may execute various computer software applications, components, programs, objects, modules, and data structures, such as virtual machines 111.

The server 105 may include network adapters 115 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement of Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the virtual switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames received by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed switch 180.

The distributed virtual switch 180, in general, includes a plurality of bridge elements 120 that may be located on a plurality of a separate, though interconnected, hardware components. To the perspective of the network adapters 115, the virtual switch 180 acts like one single switch even though the switch 180 may be composed of multiple switches that are physically located on different components. Distributing the switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect which connects bridge elements 120 located within the same chassis and rack, as well as links for connecting to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special-purpose processor) is coupled to at least one bridge element 120 or upstream PCI port 122 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
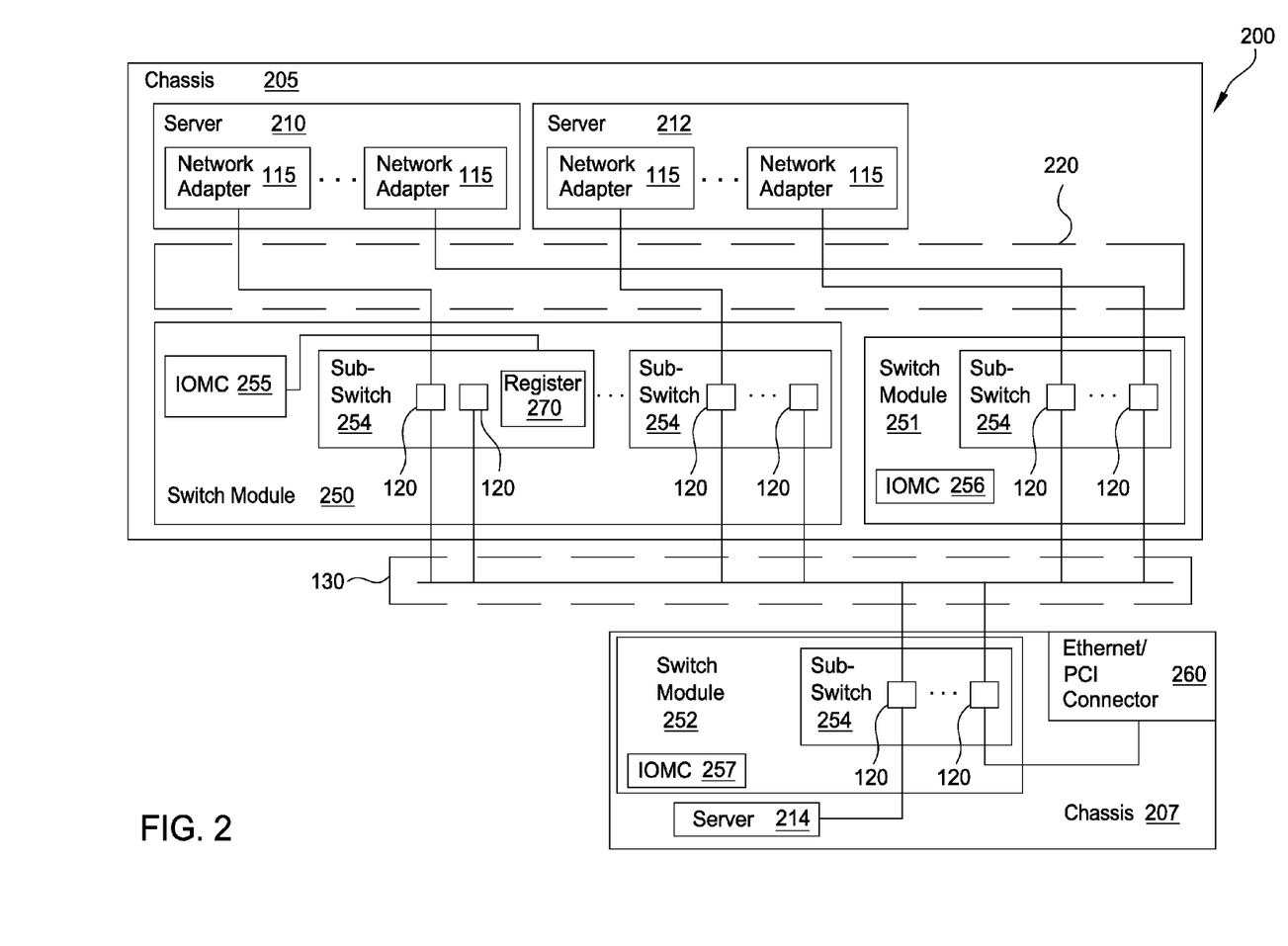
FIG. 2 illustrates the hardware representation of a system that implements a virtual switch, according to one embodiment of the invention.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130 using the routing layer. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module. As discussed above, the IOMCs 255, 256, 257 are attached to at least one sub-switch 254 (or bridge element 120) in each switch module 250, 251, 252 which enables each IOMC to route commands on the switching layer 130. For clarity, these connections for IOMCs 256 and 257 have been omitted. Moreover, switch modules 251, 252 may include multiple sub-switches 254.

As shown, IOMC 255 is connected to a sub-switch 254 that includes one or more registers 270. Additionally, each of the bridge elements 120 of the switch 180 may have one or more registers 270. The registers 270 are hardware storage devices that are accessible to the IOMC 255 located on the same switch module 250 as the register 270. Moreover, the register 270 may also be accessible to every other IOMC 256, 257 in the switch via the switching layer 130. That is, as long as the sub-switch 254 associated with the register 270 is connected to the switching layer 130, that register 270 may be accessible by any other IOMC connected to the switching layer 130.

In one embodiment only one IOMC "owns" a register 270. For example, only the special-purpose processor (e.g., IOMC 255) that is physically located on the same hardware component (e.g., switch module 250) as the register 270 is given the permissions necessary to both write to and read from the register 270. In contrast, IOMCs 256, 257 located on different hardware components are able to only read from the register 270. Stated differently, the register 270 is read-only memory for the IOMCs 256, 257 located on different switch modules 251, 252. This enables IOMC 255 to publish information on the register 270 which can then be read by other IOMCs connected via the switching layer 130. The other IOMCs, however, are not permitted to change the published data which may prevent the data from becoming corrupted.

In one embodiment, each register 270 may be associated with an IOMC on the same switch module. Because all the registers 270 are interconnected via switching layer 130, each register 270 makes up a portion of a shared memory region. Thus, each register 270 may be accessed by any of the IOMCs. However, an IOMC may be limited to read only access for a particular register.

Moreover, this invention is not limited to IOMCs that are connected to registers 270 in the sub-switches 254. Instead, the registers 270 may be located within the same chip as the IOMC. The embodiments discussed herein may be applied to any distributed system that elects a master processor using a shared memory region to publish information about the respective processor.

In one embodiment, the IOMC 255 detects that it is directly connected to a particular bridge element 120 by, for example, a wire or trace on the PCB board making up the switch module 250. This indicates to the IOMC 255 that it can write to the associated register 270. In contrast, other IOMCs 256, 257 may detect that they must traverse the switching layer 130 in order to reach a bridge element. This indicates to those IOMCs 256, 257 that the associated register or registers 270 are read-only.

The data published in the register 270 may be used to elect a master IOMC. In one embodiment, in order for the virtual switch to begin to fully route cells between the sub-switches 254, each sub-switch 254 must be assigned a unique ID. Because it may be helpful to elect a master to perform this function (or other special functions), the registers 270 may serve as a shared memory region when the switch modules 250, 251, and 252 first power-on and a master needs to be elected. Once the master IOMC is elected, it can then assign the unique IDs to each sub-switch 254 using the switching layer 130 so that the switch 180 may achieve full functionality.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130 via the routing layer. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
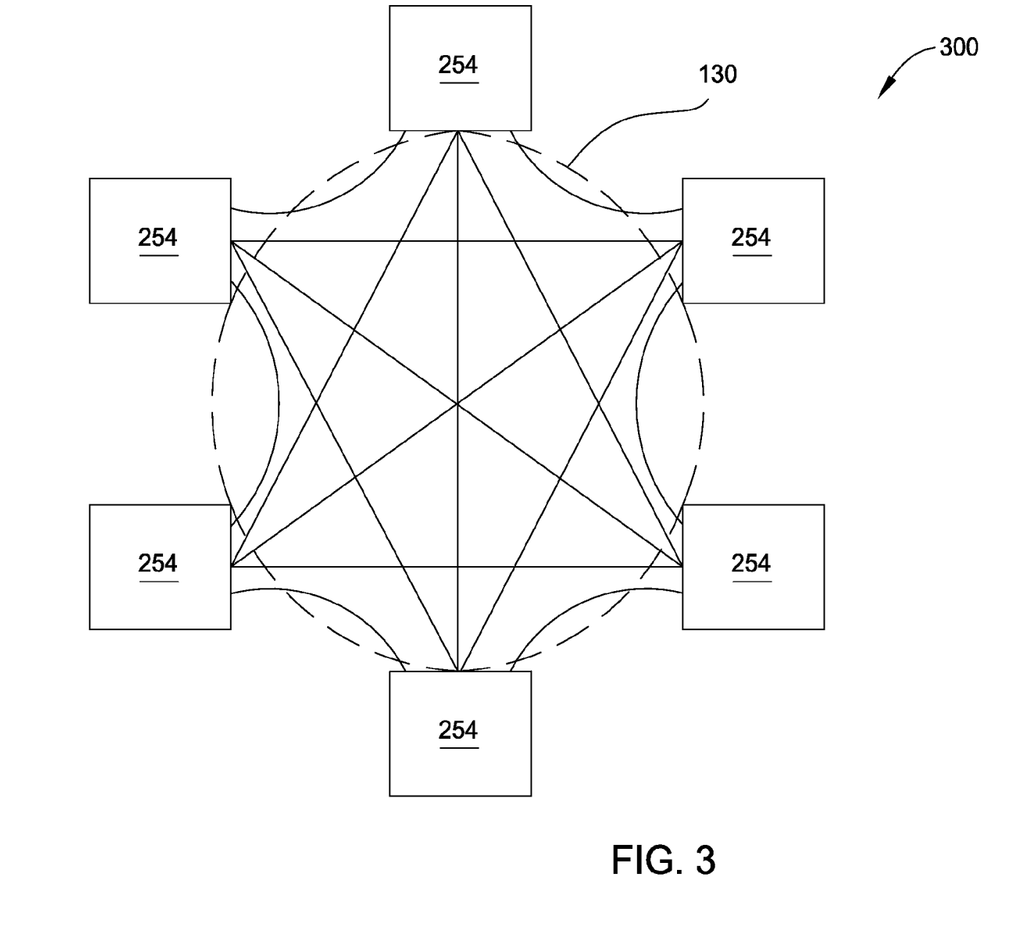
FIG. 3 illustrates a virtual switch, according to one embodiment of the invention.

FIG. 3 illustrates a virtual switching layer, according to one embodiment of the invention. Each sub-switch 254 in the systems 100 and 200 are connected to each other using the switching layer 130 via a mesh connection schema. That is, no matter the sub-switch 254 used, a cell (i.e., data packet) can be routed to another other sub-switch 254 located on any other switch module 250, 251, 252. This may be accomplished by directly connecting each bridging element 120 of the sub-switch 254—i.e., each bridging element 120 has a dedicated data path to every other bridging element 120. Alternatively, the switching layer 130 may use a spine-leaf architecture where each sub-switch 254 (i.e., a leaf node) is attached to at least one spine node. The spine nodes route cells received from the sub-switch 254 to the correct spine node which then forwards the data to the correct sub-switch 254. However, this invention is not limited to any particular technique for interconnecting the bridging elements 120.

Discovery Process

When the switch modules are initially powered on, they must crawl through the switching layer 130 (i.e., network fabric) to discover the network topology. In generally, the IOMC 140 on each switch module may use a network discovery process to locate each of the sub-switches located in different switch modules. For example, in this state, the distributed virtual switch may be unable to send data frames between the different sub-switch 254 but each IOMC 140 is still able to probe the different connections between the sub-switch 254. Specifically, an IOMC 140 may use one or more local rack interconnect links (not shown) to crawl through the fabric by probing each connection. This invention, however, is not limited to any particular method of determining a network topology.

Moreover, the method of determining a network topology may change based on the fabric of the network. For example, if each sub-switch 254 has a dedicated data path to every other sub-switch 254, the IOMCs 140 may crawl through the fabric based on an adjacent node protocol. If the mesh is formed using a spine-leaf architecture, the number of hops between the leaf nodes and spine nods may be used to traverse the fabric. Nonetheless, the embodiments disclosed herein are not limited to any particular method of creating a mesh network or discovering the network's topology.

As the IOMC 140 discovers sub-switch 254 located on different switch modules, it may also read the data stored in an associated register 270. If that register is used by a peer IOMC 140 to publish information, the probing IOMC 140 may record the data for use during the master election process.

Master Election

Figure 4:
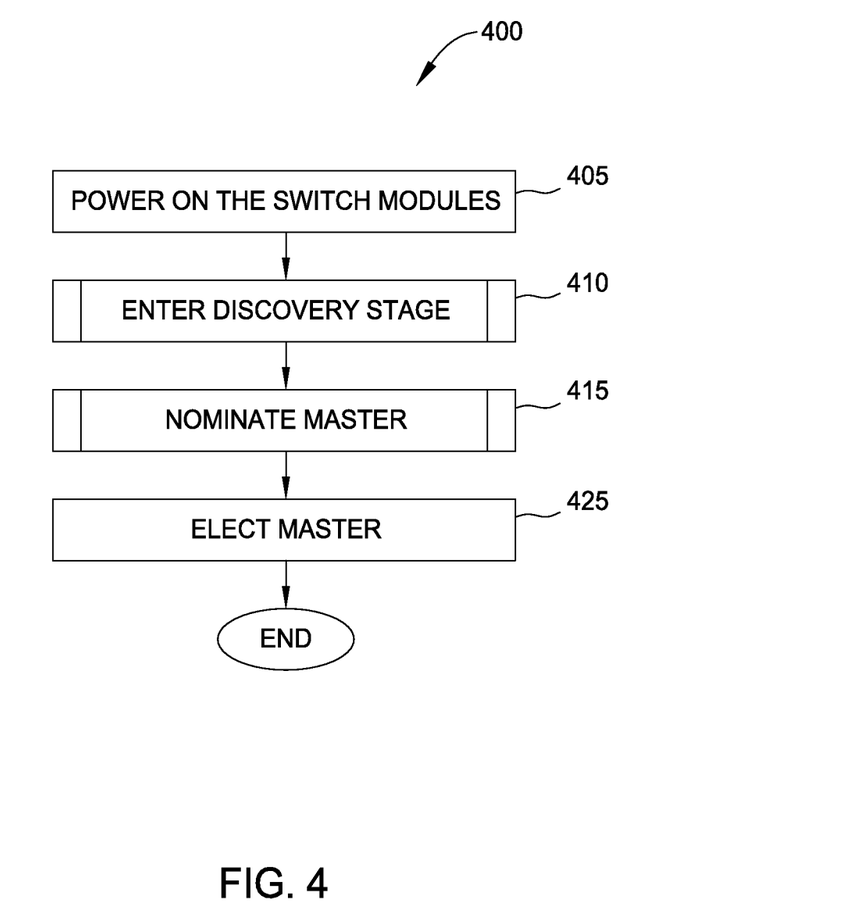
FIG. 4 illustrates a technique for electing a master, according to one embodiment of the invention.

FIG. 4 illustrates a technique 400 for electing a master, according to one embodiment of the invention. At step 405, the switch modules may be attached to a chassis and powered on. For example, the servers 210, 212, 214 may be shipped in chassis 205 and 207 with the switch modules 250, 251, 252 already attached. A system administrator may then attach the chassis to a power supply. In this case, each of the switch modules 250, 251, 252 may be powered on simultaneously. However, in other embodiments, the switch modules may be powered on at different times. For example, a switch module may malfunction and a new one may be plugged in (i.e., hot-swapped). In this case, the IOMC 140 on the new switch module is able to locate and find a previously elected master IOMC 140. This process will be discussed below in reference to FIG. 5.

At step 410, the IOMCs 140 of the powered on switch modules enter a discovery stage. This may involve crawling through the network fabric to determine the network topology, publishing data in a register, and reading data published by other IOMCs 140.

At step 415, each powered-on IOMC 140 nominates a master IOMC 140. For example, each IOMC 140 may have a unique ID, such as a control port ID, a serial ID, MAC address, and the like. However, any ID may be used so long as it uniquely identifies the IOMC 140 from all others. As the IOMCs 140 crawl the network they read the published ID from other IOMCs 140. The IOMC 140 may then use one or more criteria to determine a nominee or candidate to be the master IOMC 140. For example, if the unique ID is numerical, the criteria may be the ID with the lowest value or the highest value. As the IOMC 140 probes the networks, it may keep record of the ID that best matches the criteria—e.g., the lowest value. After the IOMC 140 has completed the network discovery process, the ID that best matches the criteria would be its nominee.

Also, each IOMC 140 may determine if there is a consensus. Each IOMC 140 may re-traverse the network to determine if all other IOMCs 140 have nominated the same master IOMC 140 as itself. Specifically, each IOMC 140 compares its nominated ID with the other published IDs. If they are the same, then at step 425, the master is elected. If not, the process 400 may return to step 410 to perform the discovery process again. That is, if at least one IOMC 140 discovered an IOMC 140 that has a ID that better satisfies the criteria, the process 400 continues until all the IOMCs 140 have discovered the same IOMC 140—i.e., the IOMC 140 that best matches the criteria.

Figure 5:
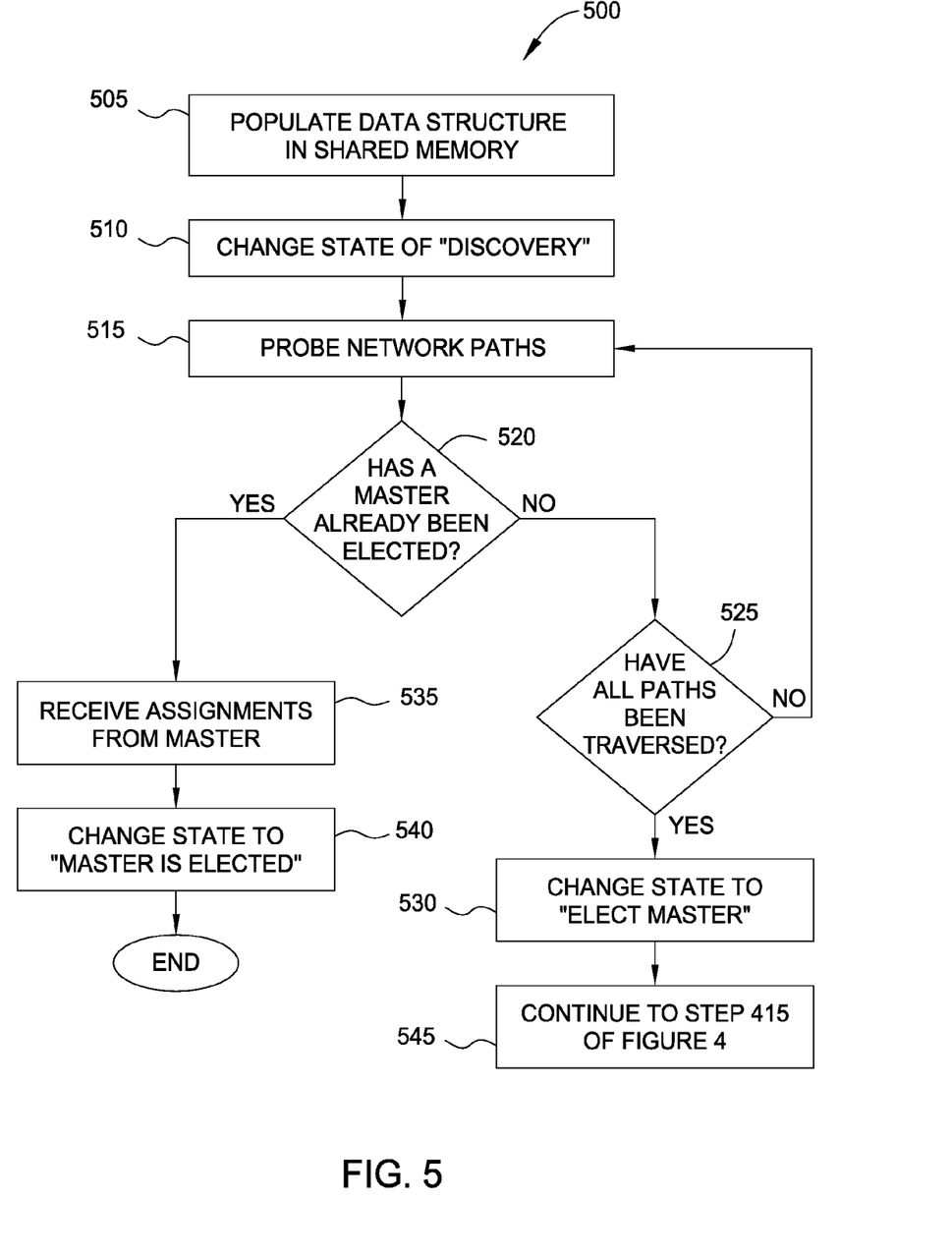
FIG. 5 is a technique for performing the discovery stage in the process illustrated in FIG. 4, according to one embodiment.

FIG. 5 is a technique 500 for performing the discovery stage in the process illustrated in FIG. 4, according to one embodiment. Specifically, FIG. 5 illustrates a more detailed flow chart associated with step 410 of FIG. 4. At step 505, each IOMC 140 may populate a data structure that provides a communication medium between the other IOMCs 140 in the switch 180.

In one embodiment, the data structure may be published on shared memory that is interconnected between the different IOMCs 140. That is, each IOMC 140 has at least one data path to the shared memory. The IOMCs 140 may use the data path to read and/or write to the memory. For example, the registers 270 may serve as shared memory that is communicatively coupled to the IOMCs 140 that are located on the switch modules. In this sense, the registers 270 on each of the sub-switch 254 provide a distributed shared memory for the distributed IOMCs.

Figure 6:
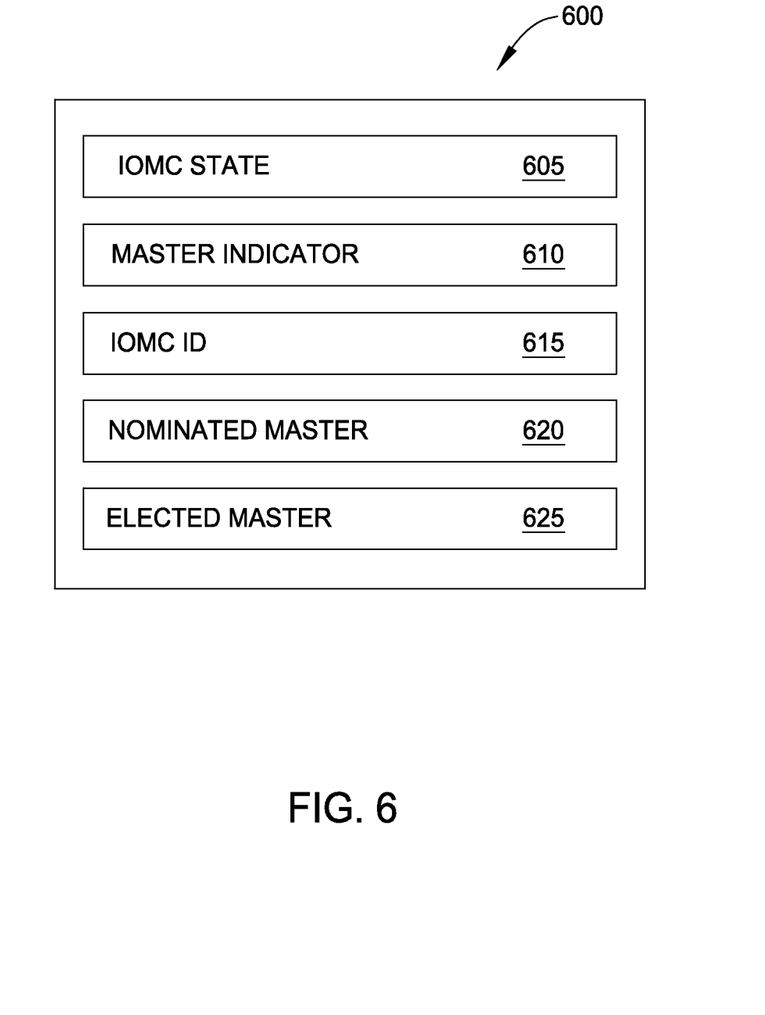
FIG. 6 is a table that represents a data structure stored in shared memory, according to one embodiment.

FIG. 6 is a table 600 that represents a data structure stored in shared memory, according to one embodiment. The table 600 is a graphical representation of a possible data structure that may be stored in a register 270 of a sub-switch 254. The table 600 includes an IOMC state 605 which informs other IOMCs 140 of the state of the IOMC 140 that owns the register 270. Example of states include "discovery", "electing a master", or "master is elected". However, the invention may include any number of states to coordinate the distributed IOMCs 140.

The master indicator 610 may be, for example, a Boolean value. The master indicator 610 may be TRUE when the IOMC 140 that owns the data structure is the elected master for the switch, but FALSE is the IOMC 140 is not the master. Moreover, the master indicator 610 may have a NULL value to indicate that a master has not yet been elected.

The IOMC ID 615 is a value that uniquely identifies the owning IOMC 140 from all other IOMCs 140 presently connected to the switch and any IOMCs 140 that may be added at a future time. As discussed previously, the ID may be a control port ID, a serial ID, MAC address, and the like that may be given to each IOMC 140 by the manufacturer.

After the owning IOMC identifies the IOMC with the ID 615 that best satisfies the criteria, it stores that ID 615 as the nominated master 620. As the owning IOMC 140 discovers new IOMCs 140, it may constantly update the nominated master 620 with the value of the IOMC ID 615 that best matches the criteria. Assuming that the criterion is to elect the IOMC 140 with the lowest value ID 615, if the owning IOMC 140 currently has the value 12345 as the nominated master 620 but later finds an IOMC 140 with an ID 615 of 01234, it may update the nominated master 620 to be 01234. At the end of the discovery process, the discovered IOMC ID 615 that best satisfies the criteria will be stored as the nominated master 620. Note that the nominated master 620 may be the IOMC ID 615 of the owning IOMC 140—i.e., the processor can nominate itself if its IOMC ID 615 best satisfies the criteria.

Finally, the table 600 may include the elected master 625 which stores the value of the ID 615 of the master IOMC 140. Until master election is complete or if the master election must be repeated, this value may be NULL. Publishing the elected master 625 ID in the data structure may allow newly added switch modules to quickly determine whether the master election has already completed. However, the master indicator 610 may alternatively be used for this purpose. For example, as a newly added switch module performs a discovery process to determine the network fabric, it may check the master indicator 610 of each published data structure. A "1" may indicate that the owning IOMC 140 is the master while a "0" may indicate that it is not or that a master has not yet been elected.

The data structure shown in table 600 may include other entries that are useful in the master election process. For example, the data structure may include a cyclic redundancy check (CRC) value and/or a validity bit to ensure that the values written in the data structure are valid.

Returning to FIG. 5, at step 505 each IOMC 140 may populate or instantiate a data structure that corresponds to table 600 of FIG. 6.

In one embodiment, an IOMC 140 may pause before it switches to the discovery state. For example, the IOMC state 605 may remain in a "powered-on" state for a certain period of time. This allows for other IOMCs 140 to populate their published data structures. Moreover, this ensures that the IOMC 140 discovers all the devices that will be powered on without having to repeat the process. However, the discovery process may have to be repeated if a new switch module is added to the switch 180 at a future time.

At step 510, each IOMC 140 may change the IOMC state 605 to "discovery". In general, this state 605 indicates that the owning IOMC 140 is using some method of network topology discovery to identify the network fabric of the distributed switch 180 as discussed above.

At step 515, an IOMC 140 in the "discovery" state may probe all the connections of the virtual switch 180. This may be done, for example, by iteration, by an adjacent node protocol, by counting hops between sub-switch 254, or by some combination thereof.

At step 520, as the IOMC 140 discovers other additional data structures, it may read the published data structures to gather information about the owning IOMCs 140. In one embodiment, the probing IOMC 140 may look at the master indicator 610, the IOMC state 605, or the elected master 625 of the data structure to determine if a master has previously been elected. That is, a probing IOMC 140 may have no way of knowing whether it was added individually to the switch (e.g., was plugged in after the switch was already operating) or was powered on at the same time as all the other switch modules. The probing IOMC 140 may check the master indicator 610 to determine if the owning IOMC 140 is the master IOMC 140, or determine if there is a value stored in the elected master 625. Moreover, if the IOMC state 605 is set to "master is elected" than this may be another indicator that the master election process has previously completed.

If the probing IOMC 140 determines that the master election is complete, then at step 535, the IOMC 140 may continue the discovery process to locate the master IOMC 140 and identify the remaining portion of the network fabric (if any). The master IOMC 140 can then configure the probing IOMC 140 such that it is included in the virtual switch 180—i.e., provide unique identifiers to the sub-switches 254 located on the new switch module.

At step 540, the probing IOMC 140 changes the IOMC state 605 to "master is elected" and the process may halt.

If the probing IOMC 140 determines, however, that the master election has not completed, then at step 525 the probing IOMC 140 determines if it has completed the discovery process. If not, it returns to step 515 to continue discovering the network topology.

Once the IOMC 140 has completed this process, at step 530 it changes the IOMC state 605 to "elect master". Because the probing IOMC 140 believes it has navigated the entire fabric of the distributed switch 180, it may stop the discovery process and signal to the other IOMCs 140 (via the state change) that it is ready to nominate a master IOMC 140.

In one embodiment, the probing IOMC 140 may continually update the nominated master 625 value as it discovers additional IOMCs 140. Once the probing IOMC 140 discovers a new published data structure, it may access the IOMC ID 615 stored in that data structure and determine whether that ID 615 better satisfies the criteria for selecting a master than the ID currently stored in the nominated master 620 for the probing IOMC's own data structure. If so, the probing IOMC 140 may replace the nominated master 620 value in its data structure with the value of the IOMC ID 615. Alternatively, after the IOMC 140 has determined the network topology, it may again traverse the fabric and compare the IOMC IDs 615 to determine the IOMC 140 that best satisfies the criteria.

At step 544, the technique 500 may return to step 415 of FIG. 4 to elect the master IOMC 140.

Figure 7:
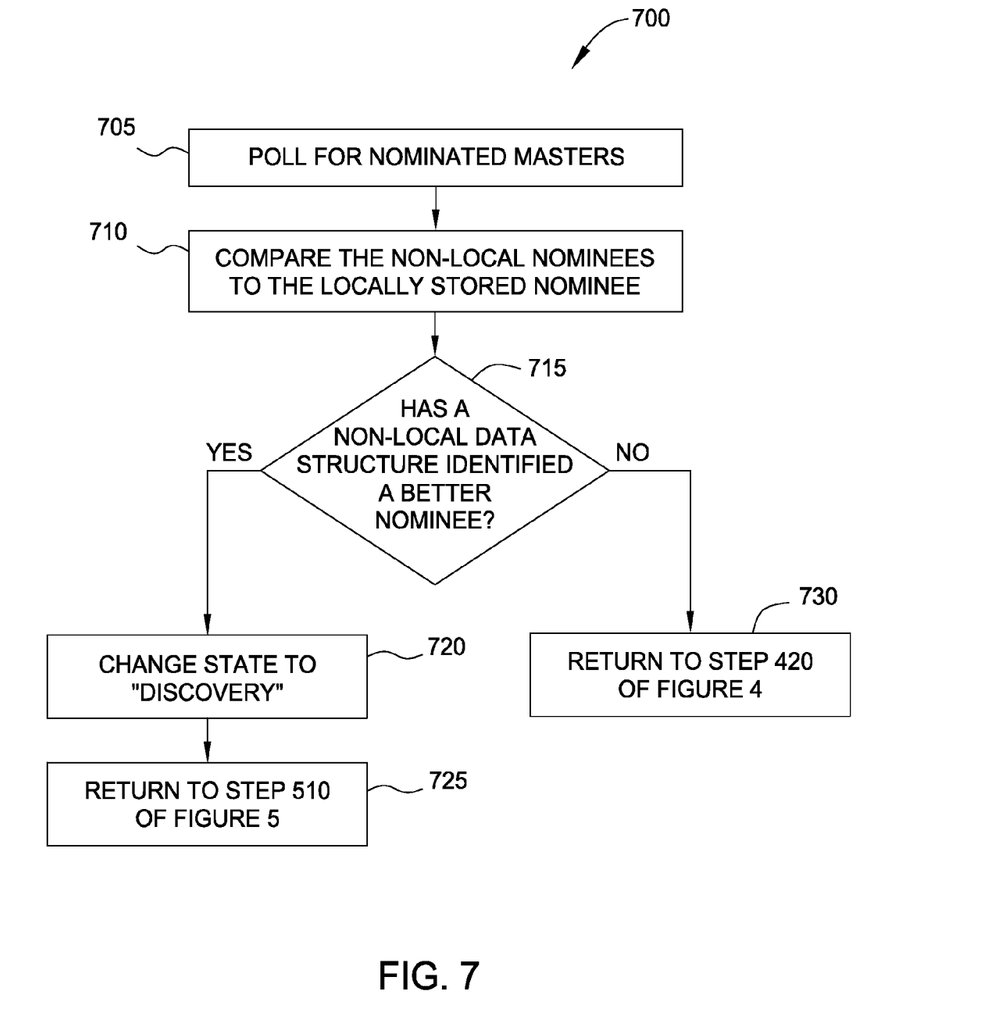
FIG. 7 illustrates a technique for performing the master election in the process illustrated in FIG. 4, according to one embodiment.

FIG. 7 illustrates a technique 700 for performing the master election in the process illustrated in FIG. 4, according to one embodiment. Specifically, FIG. 7 illustrates a more detailed flow chart associated with step 415 of FIG. 4. At step 705, an IOMC 140 in the "elect master" state 605 polls the published data structures to determine their respective nominated master 620. That is, the IOMC 140 reads from each of the data structures the value of the nominated master 620 and, at step 710, compares these values to the IOMC's own nominated master 620 value stored in its data structure (e.g., the register 270 that is directly connected to the IOMC 140). Because the topology of the network fabric is already known, re-scanning the published data structures may require less time than when the switch module first powered-on and had to complete a network discovery process.

If at step 715, the IOMC 140 discovers that a different IOMC 140 nominated as master an IOMC 140 that better satisfies the criteria than the IOMC's own nominee, then at step 720 the polling IOMC 140 changes its IOMC state 605 from "electing master" back to "discovery". This may occur if the current IOMC 140 probed a connection where the switch module was powered off or the data structure was not yet instantiated. However, a second IOMC 140 may have found the switch module after it was powered on. In this case, the current IOMC 140 would not have found the newly powered-on IOMC 140. Accordingly, the logic in the current IOMC 140 instructs the IOMC 140 to repeat the discovery process. Specifically, at step 725, the technique 700 may return to step 515 of FIG. 5. By repeating the discovery process, the IOMC 140 will discover the IOMC 140 that better satisfies the criteria on the fabric network. Once the discovery process is complete and the IOMC 140 has found the IOMC 140 that best satisfies the criteria, the technique 700 may progress to step 730 and return to step 425 of FIG. 4.

A similar process may be performed by all the IOMCs 140 on the switch modules. If each of the IOMCs 140 determine that they have nominated the same master as all the others, then at step 425 of FIG. 4 the master is elected and each IOMC 140 may change its state 605 to "master is elected". Moreover, the master indicator 610 for the IOMC 140 elected master may be changed to indicate that it was elected—e.g., from NULL to "1"—while the master indicator for the other IOMCs 140 may be changed to reflect that they were not elected and are slaves—e.g., from NULL to "0". Similarly, each IOMC 140 may update the elected master 625 of the data structure to include the IOMC ID 615 of the elected master.

Moreover, the embodiments disclosed herein may also be used when the master IOMC 140 fails—e.g., is powered off, hot-swapped, or malfunctions. That is, the techniques are not limited to electing a master only when the switch modules are first powered on. Each of the slave IOMCs 140 may, for example, check the status of the master IOMC 140 at predetermined intervals to determine if it has failed. If it has, the IOMCs 140 may change their IOMC states 605 to "elect master" and poll the published data structures to determine the IOMC ID 615 that best satisfies the criteria—i.e., follow the technique 700 illustrated in FIG. 7.

In another embodiment, it may be advantageous to repeat the discovery process to determine if the network fabric has changed after detecting a failure of the master IOMC 140. In this case, each IOMC 140 may change its state 605 to "discovery" and return to step 515 of FIG. 5.

In one embodiment, the master election process may be repeated only if the current master IOMC 140 fails. Thus, even if the network topology changes, the master election process will not be repeated. For example, if additional switch modules are added to the distributed switch 180, the master election is not repeated even if the newly added switch module contains an IOMC 140 with a unique ID 605 that better satisfies the criteria than the current master IOMC 140. Accordingly, in this embodiment, once the master IOMC 140 is elected, it remains the master until it fails.

Conclusion

A distributed switch may include a plurality of special-purpose processors that control the different functions of the switch. To enable some special services, however, the distributed switch may need one of these processors to perform the role of a master. When a processor is powered on, the processor may publish a corresponding unique ID. Before electing the master, the special-purpose processors may use a discovery process to identify the network topology of the switch and evaluate the published IDs to determine which processor should be the master. If all the processors nominate the same master processor, then that processor is elected as the master and may finish configuring the distributed switch to enable the special services.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of electing a master processor from a plurality of processors, comprising:
   storing in a first portion of a shared memory a first unique identifier for a first processor of the plurality of processors, wherein the shared memory is accessible by the plurality of processors via a network fabric;
   traversing the network fabric comprising the plurality of processors to identify a network topology, while traversing the network fabric to identify the network topology:
      reading, from a second portion of the shared memory, a second unique identifier for a second processor of the plurality of processors,
      determining, based on one or more criteria, a nominee identifier from among the first and the second unique identifiers, and
      storing the nominee identifier in a register in the first portion of the shared memory, wherein the nominee identifier is read from the register by one of the plurality of processors; and
   electing the master processor that corresponds to the nominee identifier.

2. The method of claim 1, wherein electing the master processor that corresponds to the nominee identifier further comprises:
   after storing the nominee identifier in the register, determining whether the second portion of the shared memory contains the same nominee identifier;

if so, electing the master processor that corresponds to the same nominee identifier; and otherwise, determining whether a different unique identifier stored in the second portion of the shared memory better satisfies the one or more criteria than the nominee identifier.

3. The method of claim 2, further comprising, if the different unique identifier better satisfies the one or more criteria than the nominee identifier:

re-traversing the network fabric to identify a third processor of the plurality of processors, wherein the third processor stores a third unique identifier in a third portion of the shared memory; and determining, based on the one or more criteria, a different nominee identifier from among the first, the second, and the third unique identifiers.

4. The method of claim 1, wherein the first and the second portions of the shared memory are distributed such that each portion is uniquely located on separate hardware components.

5. The method of claim 4, wherein at least two of the plurality of processors are located on separate hardware components.

6. The method of claim 4, wherein the first portion of the shared memory and the first processor are both located on one of the separate hardware components, wherein, before the master processor is elected, only the first processor is permitted to write data to the first portion of the shared memory.

7. The method of claim 1, further comprising: upon determining that the elected master processor fails, electing a new master processor.

8. The method of claim 1, wherein the first portion of the shared memory is disposed on a sub-switch associated with the first processor, and the second portion of the shared memory is disposed on a sub-switch associated with the second processor.

9. The method of claim 1, wherein each processor of the plurality of processors nominates a respective processor of the plurality of processors as the master processor.

10. The method of claim 1, wherein the traversing the network fabric comprises crawling through a switching layer to locate each sub-switch of different switch modules.

11. The method of claim 10, wherein the traversing the network fabric comprises crawling along direct connections between bridging elements of each of the sub-switches of the different switch modules.

12. A method, comprising:

providing a plurality of switch modules, and each of the plurality of switch modules including a respective processor of a plurality of processors, each of the respective processors including a respective unique identifier;

storing the unique identifiers in respective registers of the plurality of switch modules, wherein the registers are accessible by any of the plurality of processors via a network fabric;

traversing the network fabric with each of the plurality of processors to identify a network topology by identifying the plurality of switch modules;

nominating a candidate master processor at each of the plurality of processors by reading with each of the plurality of processors the unique identifiers stored within the registers of the plurality of switch modules when traversing the network fabric; and electing a master processor based on a consensus of the candidate master processors.

13. The method of claim 12, wherein the traversing the network fabric comprises identifying sub-switches of the plurality of switch modules.

14. The method of claim 12, wherein the traversing the network fabric comprises crawling along direct connections between bridging elements of each of the sub-switches of the plurality of switch modules.

* * * * *